United States Patent [19]
Dear et al.

[11] 3,816,713
[45] June 11, 1974

[54] ELECTRICAL DEPLATING READ-OUT APPARATUS

[75] Inventors: Terrence A. Dear, Elkton, Md.;
Alfred Lechner; Willson C. Swartout, both of Newark, Del.

[73] Assignee: E. I. du Pont de Nemours and Company, Wilmington, Del.

[22] Filed: Apr. 12, 1973

[21] Appl. No.: 350,642

[52] U.S. Cl....... 235/92 MT, 235/92 EL, 235/92 R, 324/94, 340/173 CH
[51] Int. Cl............................................. G11c 13/02
[58] Field of Search ..... 235/92 EL, 92 MT; 324/94; 340/173 CH

[56] References Cited
UNITED STATES PATENTS
| | | | |
|---|---|---|---|
| 1,002,882 | 9/1911 | Thorpe | 324/94 |
| 3,680,063 | 7/1970 | Pinto | 340/173 CH |
| 3,696,206 | 10/1972 | Ida et al. | 179/1 N |

Primary Examiner—Paul J. Henon
Assistant Examiner—Joseph M. Thesz, Jr.

[57] ABSTRACT

An electrical deplating read-out apparatus wherein the deplating current is preselected to give an indicated value of total deplating current in milliampere-second units.

7 Claims, 1 Drawing Figure

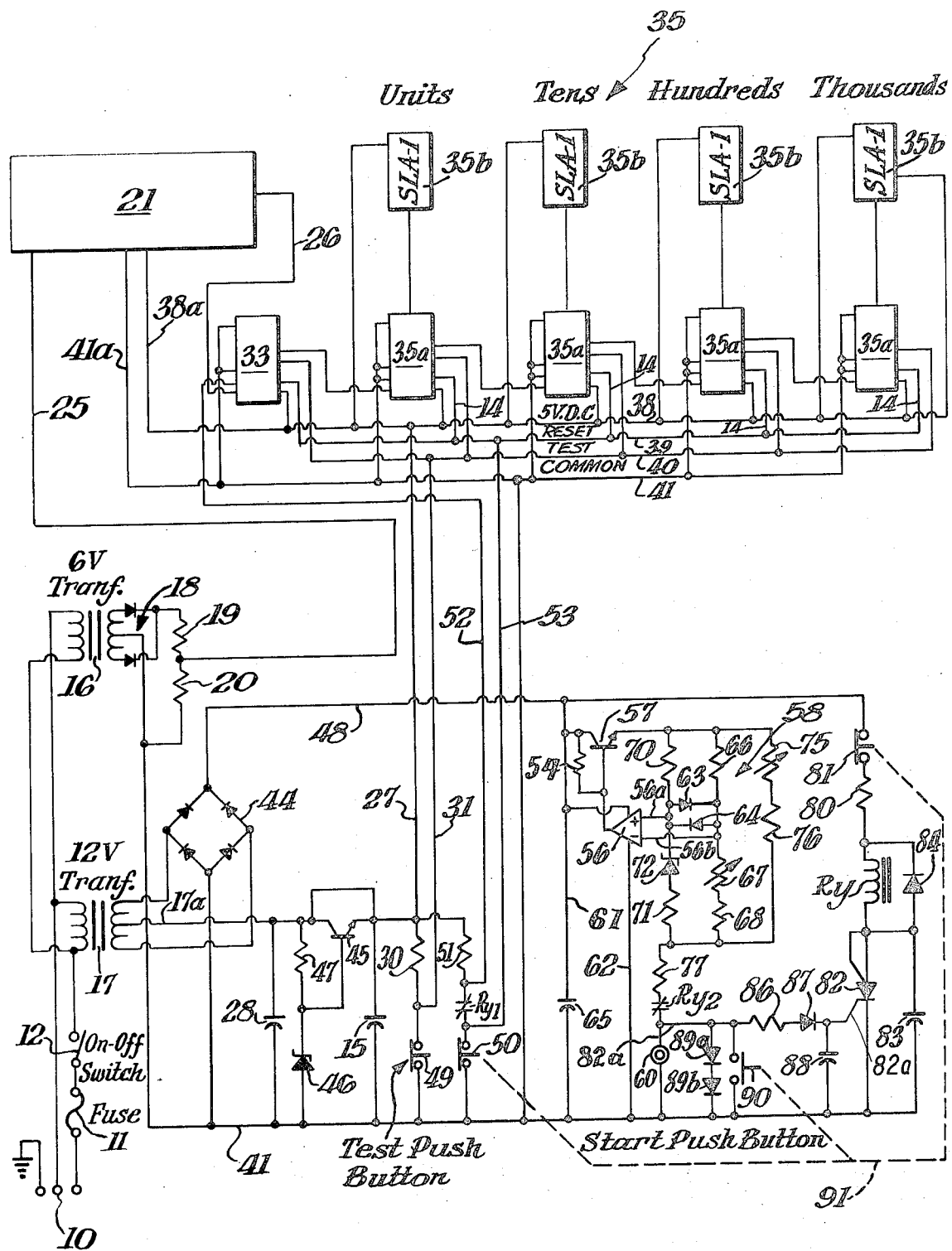

ELECTRICAL DEPLATING READ-OUT APPARATUS

BRIEF SUMMARY OF THE INVENTION

Generally, this invention comprises a digital read-out circuit operating from a fixed frequency single-phase a-c source utilizing a pair of parallel-connected transformers having their primary windings connected with the a-c source and secondary windings connected through individual full wave rectifiers one to a trigger circuit delivering counting pulses to an indicating pulse decade counter and the second to an electrical current regulating circuit supplying deplating current at a preselected level of substantially one milliampere-second for each unit count of the decade counter to an electrochemical cell carrying a chemical plate deposit which is a function of a physical measurement accumulated by the cell, and means simultaneously coordinating in time count effectuation with deplating current supply to the cell.

DRAWINGS

A preferred embodiment of the invention is shown schematically in the circuit diagram appended.

DETAILED DESCRIPTION

A variety of physical measurements can be effected by appropriate sensors which detect dynamic phenomena and pass corresponding transduced electrical signals to an integrating cell, such as an electrochemical plate-out device, one commercial cell being a Bissett-Berman Model 300 EDR. The use of such cells in the measurement of human exposure to sound energy is described in U.S. Pat. No. 3,696,206, entitled "Audio Dosimeter".

Typically, the electrochemical integrating cells accumulate a measurement of the phenomena of interest over a protracted period of time, e.g., one 8-hour working shift, after which it is necessary to disconnect the cells from their associated sensors and deplate them in order to obtain a measurement of the consummated exposure.

Adherence to governmental standards of permissible sound exposure, as well as comparisons of scientific data generally, is facilitated by read-outs of accumulated electrochemical cell plates by expression in milliampere-second units, and the apparatus of this invention provides a pulse-count read-out expressed directly in milliampere-seconds while accomplishing deplating at a very rapid rate.

Referring to the drawing, the fixed frequency single-phase power source employed can be conventional 110v, 60 Hz household current connected via a three-terminal socket denoted generally at 10. The power input is safeguarded by fuse 11 and is provided with supply switch 12.

A-c is supplied simultaneously to the digital counter circuit by a 6v. transformer 16 and to the deplating circuit by 12v. transformer 17, the primary windings of which are in parallel circuit connection. The secondary winding of transformer 16 is connected via full-wave rectifier 18 through resistors 19 (typically, 2 Kohms) and 20 (typically, 150 ohms) which, together, constitute a voltage divider reducing the output voltage to a level of about 0.6v. The conventional double Schmitt trigger is denoted generally at 21, the pulse input to which is supplied via lead 25 and the output delivered via lead 26. Operating voltage for the Schmitt trigger is supplied by extension leads 38a and 41a, connecting, respectively, to 5v. d-c common supply 38, and common 41.

The purpose of the Schmitt trigger is to shape the count train to a very steep advance slope, approaching a perfect square wave, thereby obtaining sharp on-off switching of the output signal delivered via lead 26 and a precise unambiguous count by counter 35.

The pulse output from trigger circuit 21 is supplied, at a frequency of 120 Hz where the a-c source is 60 Hz frequency, to a first decade pulse counter (typically, an MC4050P), denoted generally at 33, the function of which is to preliminarily divide the input signal by ten, so that the output of counter 33 is, in the example, a 12 pulse/sec. pulse train. Since the pulse count total of counter 33 is of no read-out significance, no indicator is associated with it. Instead, the pulse output from counter 33 is routed to the conventional four decade counter denoted generally at 35, the four counter units 35a of which can typically be types MC4050P, whereas the associated light-emitting diode indicators 35b can be types SLA-1.

Common counter stage connections are made via 5v d-c supply conductor 38, reset conductor 39, test conductor 40 and common conductor 41.

Turning now to the power circuit, the d-c operating voltage for the entire apparatus is derived from full-wave rectifier 44 connected across the ends of the secondary winding of transformer 17.

It is advantageous to utilize rectifier 44 in a double sense, namely: (1) to deliver 12v. d-c to the deplating circuit hereinafter described via lead 48 and (2) to deliver 6-7v. d-c to the voltage regulating circuit next to be described.

Thus, the two bottom diodes of rectifier 44 comprise, with the secondary winding of transformer 17, capacitor 28 (typically, 5,000 $\mu$f at 10v.) and the center tap 17a, a second full-wave rectifier adapted to supply 6-7v. d-c to the collector element of transistor 45. Transistor 45 (typically, an NPN type 2N4921) is a voltage regulator, the emitter of which is connected directly to the 5v. d-c supply line 28 via lead 27.

Capacitor 15 (typically, 100 $\mu$f, 6v.) connected across the transistor 45 emitter and common 41 is a filter capacitor.

Zener diode 46 (typically 5.6v.) connects the base of transistor 45 to common 41 and the current flow through the Zener is limited by resistor 47 (typically 390 ohms, 2 watts).

Resistor 30 (typically, 1 Kohm, one-fourth watt) is connected in shunt with transistor 45 through normally closed test push button 49, with one side of the resistor connected to lead 27 running to the 5v. d-c supply line 38 and the other side connected via lead 31 to test conductor 40.

Resistor 30 and test push button 49 are shunted by normally closed start push button 50 connected through normally closed relay contacts $Ry_1$ to resistor 51 (also typically 1 Kohm, one-fourth watt). Relay contacts $Ry_1$ are connected across lead 52 running to a reset connection on counter 33, which is effective to reset all of the counters 34a through individual leads 14 connecting them with reset conductor 39, and lead 53 completing the circuit to conductor 39.

The electrochemical cell deplating current supply is provided by transistor 57 (typically, an N type 7A30)

which is controlled by an operational amplifier 56, typically a type 2704–4 marketed by the Harris Semiconductors Company, connected to the transistor base and to the transistor collector via resistor 54 (typically, 1,000 ohms).

The emitter element of transistor 57 is connected to a parallel-connected three-branch bridge network denoted generally at 58, the left-hand branch of which consists of resistor 70 (typically, 500 ohms, 1 percent) in series with Zener diode 72 (a 6.4v. type) and resistor 71 (typically, one ohm, 1 percent), which branch is provided with an input connection 56a to operational amplifier 56.

Similarly, the middle branch of the bridge consists of resistor 66 (typically, 2 Kohms, 1 percent) connected in series with variable trim resistor 67 (typically, 1 Kohm) and resistor 68 (typically, 6,040 ohms, 1 percent), which branch is provided with input connection 56b to operational amplifier 56.

Leads 61, running to lead 48, and 62, running to common 41, constitute the power supply for amplifier 56, capacitor 65 (typically, 200 µf at 25v.) being a filter capacitor. Reversely connected diodes 63 and 64 (typically, types A19F) are protection for transistor 57 against overvoltages.

The third branch of the bridge consists of variable trim resistor 75 (typically, 200 ohms 12 ma) connected in series with resistor 76 (typically, 3,010 ohms, 1 percent).

Bridge network 58 is connected to electrochemical cell deplating socket 60 and common 41 through calibrating resistor 77 (typically, 1 ohm, 1 percent) and normally closed relay contacts $Ry_2$.

Deplating current regulation with the circuit hereinbefore described is accomplished as follows: Full-wave rectifier 44 delivers 12v. d-c to transistor 57 via lead 48. A portion of the current output of transistor 57 passes through each of the three branches of bridge network 58. However, the current through Zener diode 72 establishes a voltage above the Zener of 6.4v., which holds one side of operational amplifier 56 constant as a fixed reference. The current through the middle branch of bridge network 58 can vary, but it corresponds to the 6.4v. Zener-fixed voltage. Thus, if the current through the middle branch rises, the voltage therein will also rise, and operational amplifier 56 will sense this and will reduce the current supplied by transistor 57. Conversely, if the current through the middle branch drops, the voltage will also drop below the 6.4v. level and amplifier 56 turns on transistor 57 to increase the current output.

The balance of the current goes through the right branch, where automatic control is achieved even though there is no sensing.

Bridge network 58 permits adjustment of the deplating current supplied to an electrochemical cell plugged into socket 60 to accommodate existing temperatures, load variations, input load and output load to maintain the deplating current at a preselected level, i.e., 12 milliamperes in this example. Thus, trim resistor 67 adjusts the current supply via the middle branch to 4 ma., whereas an additional current of 8 ma. is supplied via the right-hand branch.

The balance of the circuit comprises the 12v. relay Ry connected to power lead 48 via resistor 80 (typically, 47 ohms, one-half v.) and start push button switch 81. The other relay terminal is connected to common 41 through silicon-controlled rectifier 82 (typically, a type 3N84). Relay Ry and SCR82 are shunted by capacitor 83 (typically, 0.047µf at 25v.) connected with diode 84 (typically, a type A14F). The purpose of capacitor 83 is to prevent false triggering by SCR82, whereas diode 84 prevents arcing at the switch 81 contacts.

The gating lead 82a of SCR82 is connected between relay contacts $Ry_2$ and socket 60 via resistor 86 (typically, 1 Kohm, one-half w.) and diode 87 (typically, a type 1N39F), resistor 86 limiting the current supplied to SCR82 whereas diode 87 is a blocking diode barring current backflow from SCR82 to an electrochemical cell plugged into socket 60.

Capacitor 88 (typically, a 0.047 µf, 25v.) prevents SCR82 from firing accidentally if a voltage surge occurs in the system.

Series-connected diodes 89a and 89b prevent excessively fast voltage rises across an electrochemical cell plugged into socket 60, which could otherwise damage the cell.

Normally open push button switch 90 is connected in shunt to common 41 with respect to the electrical deplating socket 60.

The two push buttons of normally closed switches 50 and 81 are mechanically ganged by tie-bar 91 for simultaneous operation with the push button of normally open switch 90.

In operation, when a-c supply plug 10 is plugged into a 110v. a-c source, light-emitting diodes 35b are immediately illuminated. An electrochemical cell (hereinafter abbreviated E cell) to be deplated is plugged in to socket 60. The ganged push-button switches are simultaneously operated by momentary depression of the common mechanical tie-bar 91.

This establishes a transient condition during which no deplating current will flow to the E cell, because push button switch 90 is now closed on its contacts, thereby establishing a shunt to common 41.

At the same time, push button switch 81 being now open, SCR82 is permitted to reset, if it had been in operation previously. Also, push button switch 50 being now open, resets counters 33 and 35a to zero.

Relay Ry cannot operate when SCR82 is turned off. Under these conditions relay contacts $Ry_1$ and $Ry_2$ are both closed; however, no deplating current can pass through bridge network 58 to the E cell plugged into socket 60 because push button switch 90 is closed.

Now, when the ganged switch tie-bar 91 is released, switch 81 closes, but no current flows through relay Ry, because SCR82 is not turned on.

However, switch 90 being now open, deplating current is supplied to the E cell in socket 60 at a preselected rate, in this example 12 milliamperes/sec.

Also, left-hand push button 50 has just closed, which deactivates counter reset, because the switch shorts to common 41. This connects lead 52 to common, which signals counter 33 to commence counting pulses, which are progressively totaled on subsequent counters 35a and indicated on associated light-emitting diodes 35b.

When deplating of the E cell in socket 60 is completed, which typically requires 8.33 seconds for a cell charged to 100 milliampere-second (or 100 percent), the resistance of the E cell rises abruptly, which gates SCR82 to conduction. Relay Ry is thereupon energized, which opens relay contacts $Ry_1$ to discontinue the counting by signal transmitted via lead 52 to the appropriate pin connection with counter 33. Similarly, relay contacts $Ry_2$ are now opened, so that deplating current supply to the E cell is discontinued.

The deplated E cell can now be removed from socket 60, and replaced by a charged E cell, whereupon the deplating cycle can be repeated.

It is convenient to utilize a data conversion table to change milliampere-seconds to decibel sound exposures.

The data conversion table was generated from equations which applicants have developed to describe the current Federal noise criteria as set out in the Occupational Safety and Health Act of 1970, paragraph 1910–95, these being:

1. $Lp_2 = 90 + 16.66 \; Log_{10}$ (Percentage Exposure/100%) dBA where $Lp_2 =$ the equivalent sound pressure level referenced to 0.0002 microbar, and Percentage Exposure = the resultant sum of the mixed exposure equation contained in the footnote to Table G–16 of the Federal noise criteria as expressed in per cent (refer par. 1910.95 supra)

$$(2) T = \frac{480}{2^{\left(\frac{Lp_2 - 90}{5}\right)}} \text{ minutes}$$

where T = minutes of permissible employee exposure at the equivalent summation level, $Lp_2$ corresponding to each of the nine pairs of time-exposure levels contained in Table G–16 *supra*. The denominator term is intended to constitute the numeral 2 raised to the parenthetical power given.

An additional equation is obtained when $Lp_2$ is eliminated between Equation (1) and (2), this being:

$$(3) T = \frac{480}{10^{\left(\frac{Log_{10} \text{ Percentage Exposure}}{100 \text{ Per cent}}\right)}}$$

where the variables are as hereinbefore defined, and, again, the demoninator is the power term reported.

The audio-dosimeter of U.S. Pat. No. 3,696,206 satisfies the relationships and the Federal noise criteria exactly, and the table giving the permissible time of employee exposure and equivalent dBA level is directly applicable to the percentage, i.e., equals milliampere-seconds of E cell readout, obtained as a read-out from this dosimeter when the read-out apparatus of this Application is employed.

What is claimed is:

1. A digital read-out circuit operating from a fixed frequency single-phase a-c source comprising a pair of parallel-connected transformers having their primary windings connected with said a-c source and secondary windings connected through individual full-wave rectifiers one to a trigger circuit delivering counting pulses to an indicating pulse decade counter and the second to an electrical current regulating circuit supplying deplating current at a preselected level of substantially one milliampere-second for each unit count of said decade counter to an electrochemical cell carrying a chemical plate deposit which is a function of a physical measurement accumulated by said cell, and means simultaneously coordinating in time count effectuation with deplating current supply to said cell.

2. A digital read-out circuit according to claim 1 operating from a fixed frequency single-phase a-c source having a frequency of 60 Hz and a deplating current supply at a preselected level of 12 milliampere-seconds.

3. A digital read-out circuit according to claim 1 wherein said trigger circuit comprises a first decade pulse counter preliminarily dividing the input signal by ten so that the output of the succeeding counter is a pulse train having a frequency of one tenth that of said fixed frequency single-phase a-c source.

4. A digital read-out circuit according to claim 1 wherein said electrical current regulating circuit supplying said deplating current to said electrochemical cell comprises a current regulating circuit provided with a current regulating transistor having its base element connected in circuit with an operational amplifier responsive to a bridge network sensing said deplating current magnitude and maintaining said deplating current at said preselected level of substantially one milliampere-second for each unit count of said decade counter.

5. A digital read-out circuit according to claim 1 wherein said means coordinating in time said time count effectuation with deplating current supply to said electrochemical cell comprises an electrical relay having its coil shunt-connected with respect to said current regulating circuit and with relay switching contacts in control circuit, respectively, with said trigger circuit and with said electrical current regulating circuit, and ganged over-riding manual switching contacts in series circuit with said relay switching contacts.

6. A digital read-out circuit according to claim 5 provided with a silicon-controlled rectifier in series circuit with said coil of said electrical relay and with gating element in electrical circuit with the current supply side of said electrochemical cell.

7. A digital read-out circuit according to claim 6 wherein said over-riding manual switching contacts in series circuit with said relay switching contacts comprise a start push-button switch which resets said indicating pulse decade counter and said silicon-controlled rectifier and simultaneously turns on the supply of said deplating current to said electrochemical cell.

* * * * *